United States Patent
Scheinert et al.

(10) Patent No.: US 7,117,015 B2
(45) Date of Patent: Oct. 3, 2006

(54) INTERNET BASE STATION

(75) Inventors: Stefan Scheinert, San Diego, CA (US); Richard Down, Atlanta, GA (US)

(73) Assignee: Intel Corporation, INC, Santa Clara, CA (US)

( * ) Notice: Subject to any disclaimer, the term of this patent is extended or adjusted under 35 U.S.C. 154(b) by 0 days.

(21) Appl. No.: 10/280,733

(22) Filed: Oct. 25, 2002

(65) Prior Publication Data

US 2004/0204097 A1 Oct. 14, 2004

(51) Int. Cl.
*H04Q 7/24* (2006.01)

(52) U.S. Cl. .............. 455/561; 455/450; 455/562.1; 370/328

(58) Field of Classification Search ........... 455/561, 455/562.1, 461, 424, 450; 370/328, 335, 370/338, 352
See application file for complete search history.

(56) References Cited

U.S. PATENT DOCUMENTS

| | | | |
|---|---|---|---|
| 5,787,344 A | | 7/1998 | Scheinert ............. 455/422 |
| 5,910,946 A | * | 6/1999 | Csapo ................. 370/328 |
| 6,128,496 A | | 10/2000 | Scheinert ............. 455/446 |
| RE37,820 E | | 8/2002 | Scheinert ............. 455/422 |
| 6,459,900 B1 | | 10/2002 | Scheinert ............. 455/446 |
| 6,603,975 B1 | * | 8/2003 | Inouchi et al. ........ 455/450 |
| 2002/0075846 A1 | * | 6/2002 | Valentine et al. ...... 370/352 |
| 2002/0089951 A1 | * | 7/2002 | Hyun et al. .......... 370/335 |
| 2002/0131387 A1 | * | 9/2002 | Pitcher et al. ........ 370/338 |

* cited by examiner

*Primary Examiner*—Nick Corsaro
*Assistant Examiner*—Alan Gantt
(74) *Attorney, Agent, or Firm*—Blakely Sokoloff, Taylor & Zaffman

(57) ABSTRACT

A portable, low power base station is configured to convey wireless traffic between a mobile station and a conventional wireless network via the Internet. The base station is configured to connect to the Internet at a user-selected location and establishes a small area of wireless coverage within a greater macrocell network. The user sets the operating parameters of the base station.

10 Claims, 4 Drawing Sheets

INTERNET BASE STATION

FIELD OF THE INVENTION

The present invention relates generally to radio or wireless communications and, more particularly, to a low power, personal base station configured for incorporation within a wireless network via the Internet.

BACKGROUND OF THE INVENTION

In a conventional wireless communication network, a large geographic region (such as the United States, for example) is divided into smaller coverage or service areas. A limited number of service providers (e.g., Sprint, Verizon, Cingular, etc.) are authorized to provide wireless services within each service area. Each authorized service provider within a service area, in turn, is allocated a specific frequency band that it may use to provide its wireless services. Hence, the amount of wireless traffic that is possible within a service area is limited by the finite frequency spectrum within that area that has been allocated to the service providers.

Wireless service providers face a number of difficult and intertwined issues. One issue is how to make the most of their finite frequency spectrum within a given service area. This issue has been addressed by division of service areas into smaller sub-areas known as "cells". FIG. 1 depicts a service area 10 divided into a plurality of cells 12. The basic cell is sometimes referred to as a "macrocell". Each macrocell 12 has a transmit/receive antenna 14 at its center to provide coverage for users within that cell. By configuring the antenna with an appropriate power and scope of coverage to cover only its cell, frequencies can be re-used in nonadjacent cells, thereby significantly increasing the service provider's traffic handling potential. This concept, which is known as "frequency reuse", significantly increases the wireless traffic handling capacity within a service area. By dividing its service area into greater numbers of cells, a service provider can increase the traffic handling capacity of the service area and, consequently, its revenue potential for that service area.

An antenna for a macrocell is incorporated along with radio transmission and reception equipment, power sources, controllers, heating/cooling equipment, hook-ups and associated electronics in an installation known in wireless parlance as a "base transceiver station" or simply a "base station". In a conventional wireless network, the base station is owned by the service provider. Base stations are extremely expensive to construct, operate and maintain. They are large and complex pieces of equipment, requiring finely-tuned antennae, equipment enclosures, cabling, power sources and backup, weatherproofing and so on. High output power is required to maximize coverage and to penetrate and provide coverage for indoor areas of the cell. They are typically installed on towers, rooftops or street poles that the service provider must have 24 hour access to for maintenance, repairs, upgrades, equipment change-outs and antenna tuning. Many construction, zoning and safety issues are implicated. Hence, a service provider's ability to increase its traffic capacity by dividing its coverage area into more cells is not unbridled; it must be balanced against the increased expenses of constructing, operating and maintaining base stations within those cells.

A conventional wireless network 20 is illustrated in FIG. 2. Network 20 comprises a plurality of base or base transceiver stations (BTSs) 22. Each base station 22 comprises an antenna and associated equipment and is located at the approximate center of a cellular coverage area, as previously described. Base stations 22 establish radio links and communicate with various mobile stations 24 (i.e. mobile telephones or wireless handsets) within their cells. Network 20 also includes a plurality of base station controllers (BSCs) 26, each of which supervises and controls the functioning of multiple base stations 22. Base station controllers 26, in turn are connected to a mobile switching center (MSC) 28. MSC 28 is the hub of network 20. It routes calls from base stations to other base stations or to the PSTN (public switched telephone network) 30 and, conversely, routes calls from PSTN 30 to base stations within its coverage area. Importantly, at least from the standpoint of the service providers, MSC 28 keeps track of the minutes of usage of all mobile stations 24 within its coverage area.

Base stations 22 are connected to BSCs 26 via dedicated lines 25, and BSCs 26 are connected to MSC 28 via dedicated lines 27. MSC 28 is connected to PSTN 30 by a dedicated, high capacity line 29. Lines 25 and 27 may be a high-capacity copper line (T1/T3 lines), a fiber optic cable or a point-to-point microwave relay. Whatever form they take, the costs of laying and/or leasing lines 25 and 27 are quite high and must be borne by the service providers. Thus, in addition to the costs of purchasing or renting the base stations and controllers themselves, the costs of laying and/or leasing dedicated lines between the stations, controllers and switching center must be considered by a service provider that is contemplating adding cells to its service area.

Another issue faced by service providers is the coverage quality and scope it is able to provide within its service area. Call quality and coverage scope are affected by several factors. In congested urban areas, traffic demand often exceeds base station capacity. Division of macrocells into smaller microcells and even smaller picocells, via installation of smaller micro- or pico-base stations at congested, urban hot spots, while less expensive than a full scale base station, still entails the cost of dedicated lines or "backhauls" to connect the equipment to the rest of the network. Conversely, in rural and suburban areas, traffic demand may be significantly lower than capacity and may not justify the costs of a base station and dedicated lines.

In areas where signals are blocked or scattered, such as indoor areas, subways and dense urban areas, signal coverage may be diminished or even non-existent. Providing good coverage in such areas is a major challenge for carriers. A significant indoor penetration loss, ranging from approximately 10–30 dB, must be overcome to achieve coverage inside of a building using an outdoor base station. A network using outdoor base stations that provides good indoor coverage must typically use very high power macro base stations within very small footprints of coverage.

SUMMARY OF THE INVENTION

The present invention addresses the cost and coverage issues associated with conventional wireless network by providing a low power, personal base station configured for incorporation within a wireless network via the Internet.

The base station of the present invention may be purchased by a retail customer and connected to a broadband or dial-up modem at home, the office or anywhere else that wireless coverage is desired. By utilizing existing IP connections in customer's homes and offices, traffic capacity is substantially increased at minimal cost to the service provider. Costs for new base station and line construction or leasing are substantially avoided, as are maintenance, operation and personnel costs.

Accordingly, one embodiment of the invention provides a portable, low power base station configured to convey wireless traffic between a mobile station and a conventional wireless network via the Internet. The base station is configured to connect to the Internet at a user-selected location, and establishes an area of wireless coverage at the user-selected location. The user sets the operating parameters of the base station.

Another embodiment of the invention provides a portable base station that is configured for rapid assignment and reassignment to multiple base controller stations within a wireless communications network without establishment of permanent connections between the base station and base controller stations.

Another embodiment of the invention provides a method for determining the location of a portable, low power base station coupled to a conventional wireless network via the Internet. The method comprises scanning the frequency spectrum for control channels emitted by nearby base stations and identifying the base station broadcast information carried on the control channels.

Another embodiment of the invention provides a method for configuring a portable, low power base station for communication with a conventional wireless network via the Internet. A base station is connected to a computer and to an Internet access device. The location of the base station is obtained from user input to the computer. The next step is to confirm that this location corresponds to a location determination made by scanning the frequency spectrum for control channels emitted by nearby base stations and identifying the base station broadcast information carried on the control channels. Finally, it is confirmed that the base station is located within a network in which it is authorized to operate.

In another embodiment of the invention, a plurality of Internet base station controllers are coupled to a mobile switching center, which manages wireless traffic between the Internet base station controllers, the PSTN and other mobile switching centers. A plurality of Internet base stations are coupled to and managed by each Internet base station controller. Each Internet base station establishes a small, low power area of wireless coverage that is configurable by the user of the base station.

A further embodiment of the invention is an improved wireless communications network. A plurality of large coverage area macrocells are established by base stations that are permanently linked to base station controllers, and a plurality of small coverage area Internet base station cells are established by portable, low power base stations that are linked to Internet base station controllers residing on Internet servers via the Internet. In one implementation, the Internet base station controllers are treated as virtual cells in order to accommodate the increased number of cells within the typical numbering scheme of a wireless protocol.

Other features, objects and implementations of the invention will be or will become apparent to one with skill in the art upon examination of the following figures and detailed description. All such additional features, objects and implementations are intended to be included within this description, to be within the scope of the invention and to be protected by the accompanying claims.

DETAILED DESCRIPTION OF THE INVENTION

Figure 1:
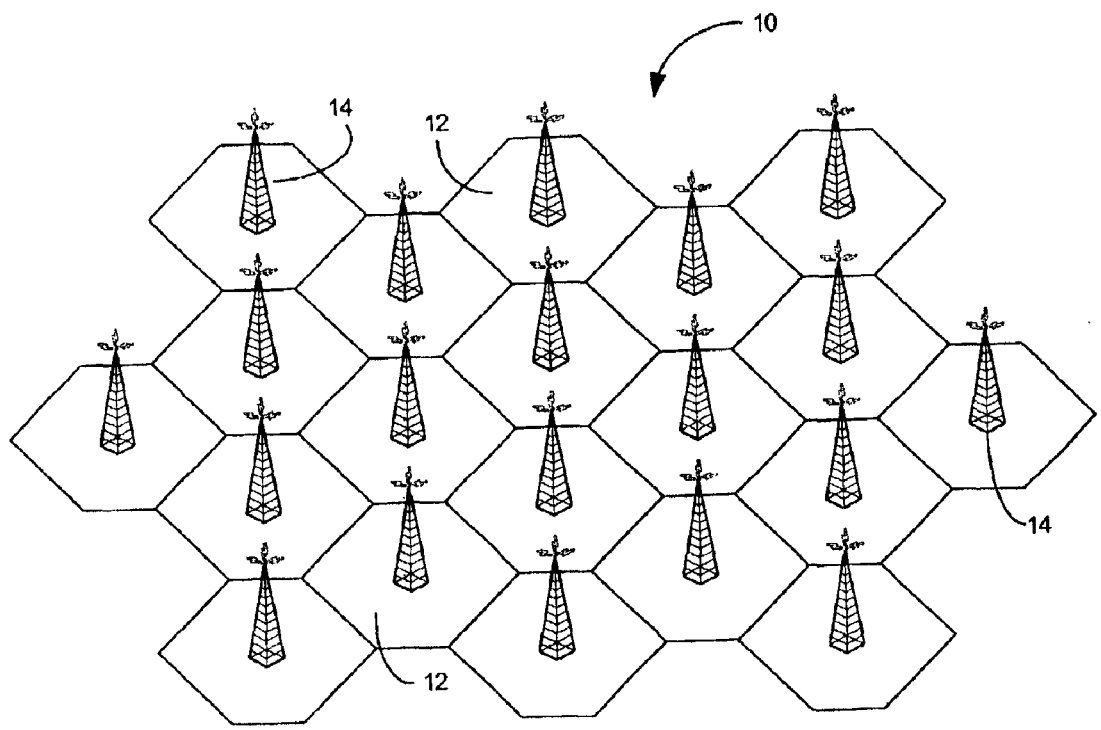
FIG. 1 is a diagram of a wireless service area divided into a plurality of macrocells.
Figure 2:
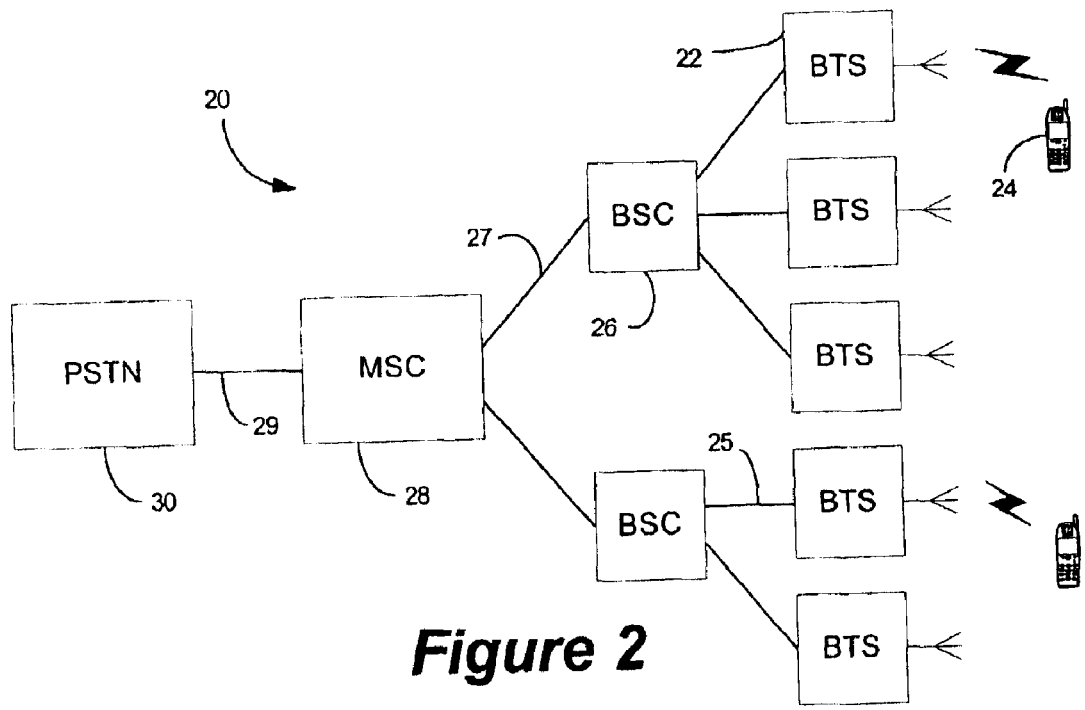
FIG. 2 is a block diagram illustrating the components of a conventional wireless communication network.
Figure 3:
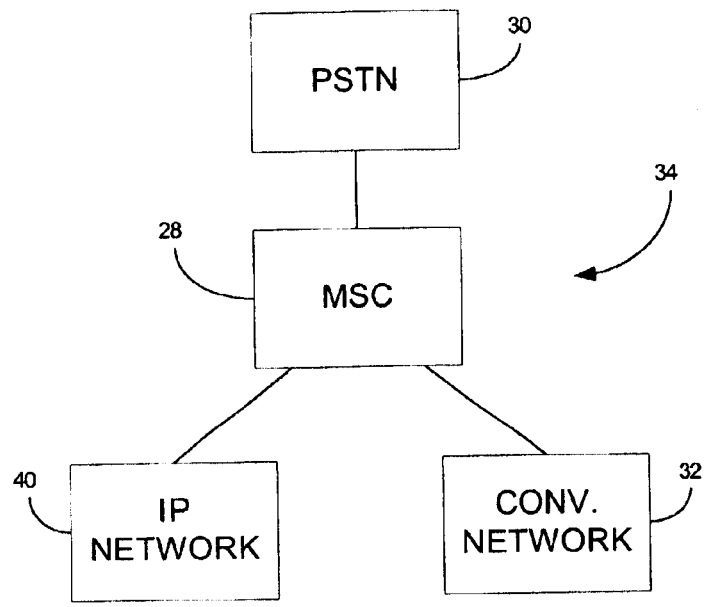
FIG. 3 is a block diagram illustrating a wireless communications network according to the present invention.

FIG. 3 is a high level diagram of a wireless communications network 34 according to the present invention. Mobile switching center (MSC) 28 connects to PSTN 30 and a conventional wireless network 32 as described previously with respect to FIG. 2. In accordance with the present invention, IP (Internet Protocol) network 40 connects to MSC 28 to augment the existing, conventional network 32 using small, low power base stations and existing IP connections in homes, offices and elsewhere. The addition of IP network 40 to network 34 results in a greater overall wireless traffic capacity for network 34 as well as better coverage in indoor, rural and other hard-to-reach areas.

Figure 4:
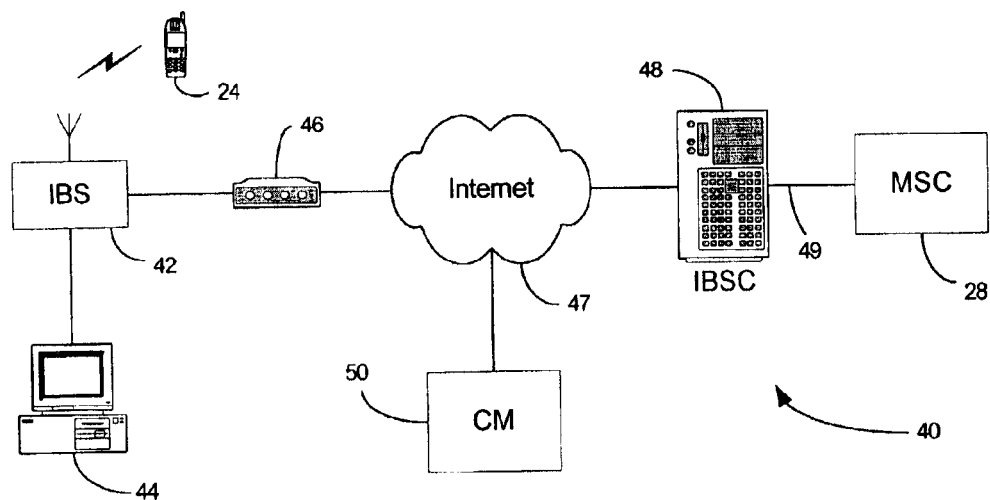
FIG. 4 is a block diagram illustrating the components of an IP portion of a wireless network according to the present invention.

FIG. 4 depicts the major components of inventive IP network 40. At the heart of network 40 is Internet base station (IBS) 42. IBS 42 is a small and low output power unit that is connected to a modem 46 and a computer 44 at a subscriber's home, office or anywhere else that wireless service is desired. Modem 46 is preferably a broadband device such as a DSL (digital subscriber line) or cable modem. The power output by IBS 42 may be very low; for example, it may be less than the power output of a conventional mobile station or wireless handset.

IBS 42 is a small, easily transportable unit that may be purchased or leased by a subscriber from a service provider or retail outlet. It functions in essentially the same manner as a conventional base station but, of course, is on a much smaller and inexpensive scale. Its essential components, such as the transmitting and receiving circuitry and antenna, may be the same or similar as those utilized in a mobile handset. The dimensions (size) of IBS 42 may also be similar to that of a mobile handset. It will be configured for connection to modem 46 and/or computer 44 (preferably via a USB or Ethernet connection) and include either a power cord for connection to an electrical outlet or an internal power supply such as a battery. Installation is a simple process, guided by the configuration manager (to be described), that can be accomplished by the subscriber without the assistance of a technician.

IBS 42 is connected via modem 46 and Internet 47 to an Internet base station controller (IBSC) 48. IBSC 48 is analogous to a base station controller in a conventional wireless network in that it manages multiple Internet base stations 42. It differs, however, in that IBSC 48 is essentially an Internet server that is connected to multiple Internet base stations via existing IP connections and the Internet backbone. Multiple IBSCs, in turn, are connected to MSC 28 and, hence, to wireless network 34. The connection between IBSC 48 and MSC 28 is a dedicated connection 49, such as a T1 or T3 line.

Figure 5:
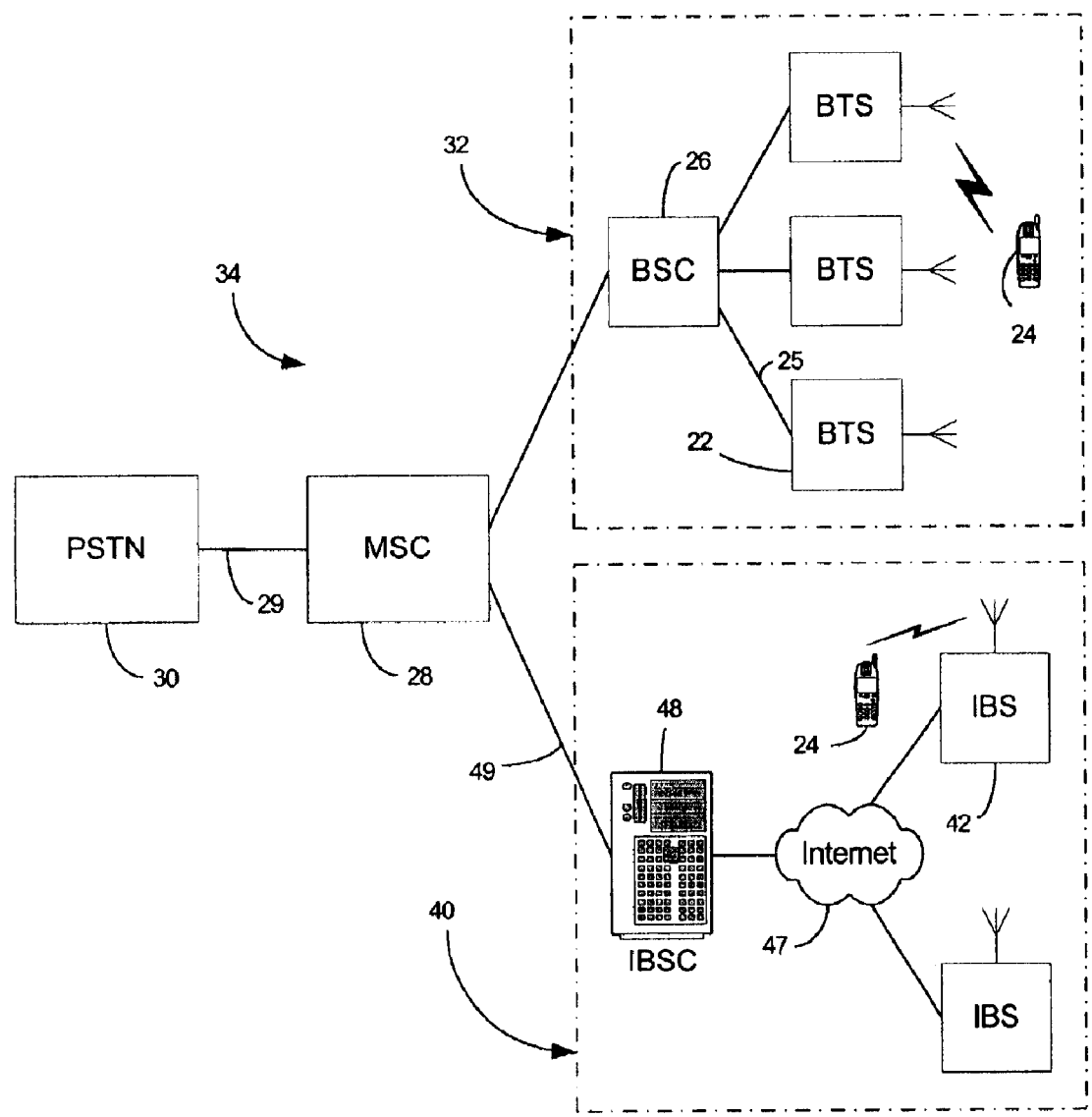
FIG. 5 is a block diagram illustrating the components of the network of FIG. 3 in more detail.

FIG. 5 is another depiction of wireless network 34, which shows the components of conventional network 32 and IP network 40 in greater detail. On one hand, there is existing conventional network 32, including base stations 22 connected to base station controllers 26 via dedicated lines 25 in a known and standard manner. Added to this by the present invention is Internet based network 40 which comprises low power, Internet base stations 42 connected via Internet links 47 to Internet base station controllers 48, which take the form of Internet servers. By utilizing existing IP connections in subscriber's homes, offices and elsewhere, the capacity of network 34 is substantially increased at minimal cost to the network operator. New, IBS cells are added to the existing macrocell network without the substantial cost of new base stations and leased lines. Instead, an Internet base station the size of a mobile handset coupled to an existing Internet link accomplishes the task.

As previously described, IBS 42 communicates with one or more mobile stations 24 over a standard air interface. One common application of IBS 42 will be to provide a small, IBS cell coverage area for a subscriber's home or office. Hence, the poorer quality indoor coverage normally provided by a conventional network 32 can be replaced with higher quality coverage by IP network 40. Better traffic management is also possible in indoor and congested areas, and service can be extended to remote areas formerly without service at all. Traffic capacity on the conventional portion of the network is increased due to the off-loading of some calls to the IP network. Since the IBS units have a low output power and coverage area, the total traffic capacity of the network may be exponentially increased. Since the units are low power, enclosed offices or homes will isolate the IBS cell from the surrounding macrocell and other IBS cells, and permit the re-use of frequencies thousands of times within the network.

Another advantage associated with IBS 42 is that various parameters, such as power output and coverage area, may actually be set in response to subscriber input. The subscriber may set the parameters to provide a greater coverage area (larger IBS cell footprint), perhaps even extending outside of his home or to adjacent homes. Conceivably, a higher power Internet base station could even be used to provide wireless service to a remote village that would otherwise be outside of any wireless coverage area. Conversely, a subscriber may opt for a smaller coverage area and more privacy. This unique feature stands in stark contrast to the conventional wireless paradigm, where base stations and their settings are always and exclusively under the service provider's control.

Since IBS 42 is very close to handset 24 during operation within the coverage area created by IBS 42, IP network 40 significantly decreases the amount of output power needed by handset 24 for wireless communications. The battery life of the handset is increased and, of importance to potential health and safety concerns, the electromagnetic radiation emitted by the handset is decreased. The signal quality is vastly improved over the signal quality typically attainable in an indoor area.

Configuration Manager

IBS 42 is designed for installation and operation by a subscriber without the help of technical personnel. Configuration manger 50 (FIG. 4), connected via the Internet to IBS 42 and the subscriber's PC 44, assists in this regard. Alternatively, configuration manager 50 may reside on IBSC 48. Upon initial installation of IBS 42, installation software (downloaded to the subscriber's PC via the Internet, an installation CD or other methods) establishes an Internet link between the subscriber's PC 44 and configuration manager 50. Configuration manager 50, via a menu or other appropriate user interface, will then complete, in cooperation with the user, several important functions including: obtaining the personal information and profile of the user; verifying the location of the IBS being configured; configuring the IBS power output, coverage area and other parameters based at least in part on the user profile/location; measuring IBS performance and reserving an appropriate bandwidth segment for wireless traffic; and integrating the IBS cell into the surrounding macrocell network. Each of these steps is described in more detail below.

User Information/Profile

Configuration manager 50 may request various items of information from the user in order to establish contact and profile information. These items may include the user's name, physical location (city, street address, zip code) of the IBS, contact telephone numbers and email addresses. The user's location information can be used advantageously in several respects. One potential use of the information is in conjunction with E-911 service (an emergency service run typically by local police and fire departments). When an emergency call is placed within an IBS cell to an E-911 operator, the IBS can automatically provide the user's address to the operator, who can dispatch emergency personnel as needed to the user's location. Another potential use of the information is in conjunction with location-based services (i.e., pizza delivery, local promotions, find restaurants or services in area, etc.).

In addition to providing name, location and contact information, a user can also provide information that will impact the operating parameters of the IBS. For example, the user can indicate whether the IBS is situated in an apartment, house, office or even a public area. Configuration manager 50 can set the output power of the IBS based on this input. In an apartment, for example, a very low output power will typically be required. In a house, a higher output power will typically be required and an even higher output power may be required to provide coverage to an entire office. The user could also be asked, for example, whether he would like to maximize coverage (higher power output) or maximize privacy (lower power output), or whether he would like to minimize power consumption. In one implementation, the user may opt for "basic" profile options, where the power/coverage level is set in response to simple questions such as these or, alternatively, could opt for "advanced" profile options where the user has a greater hand in fine tuning the power output. An advanced user could be prompted to enter parameters such as square footage and dimensions of the intended operating environment, placement of the IBS unit in relation to the environment, greatest distance from the IBS unit that he intends to operate his handset from, and so on, in order to obtain a finely "customized" IBS cell coverage area.

Where IBS 42 is to be configured for operation within a GSM wireless network (Global System for Mobile Communication, which is the standard wireless service in many countries) using TDMA, the user may also be prompted to enter the number of handsets that will be operating within this particular IBS cell (i.e., within the user's house or office). Based on this information, configuration manager 50 can reserve an appropriate number of TDMA timeslots for transmission. If the user is equipped with and intends to use GPRS (General Packet Radio Service, a data service customized for "bursty" data applications and a primary feature of what has become known as 2.5G), additional timeslots can be reserved for GPRS transmissions as well.

The discussion of special configuration features that would be applicable in a GSM environment are given by way of example only, and are not intended to limit the wireless environment in which the present invention may be deployed. The present invention may also be advantageously deployed in CDMA, 3G and other wireless environments, with special configuration features being provided that are appropriate to those standards.

IBS Location and Authentication

Configuration manager 50 preferably authenticates the location of IBS 42 independently of any location information manually input by the user. This is important to confirm that the user is where he says he is and, from the service provider's perspective, to confirm that usage of the IBS unit in its determined location is compatible with the service provider's license. If a user has a Cingular IBS, for example, it is important to confirm that the IBS is being deployed in an area where Cingular is a licensed network operator, in an area where Cingular has an appropriate "roaming" agreement or, as will be described in greater detail shortly, in an area where Cingular has a "hosting" agreement or the like with the network operator that permits operation of the Cingular IBS within the operator's footprint. There are several steps that may be taken to authenticate the location of the IBS.

Figure 6:
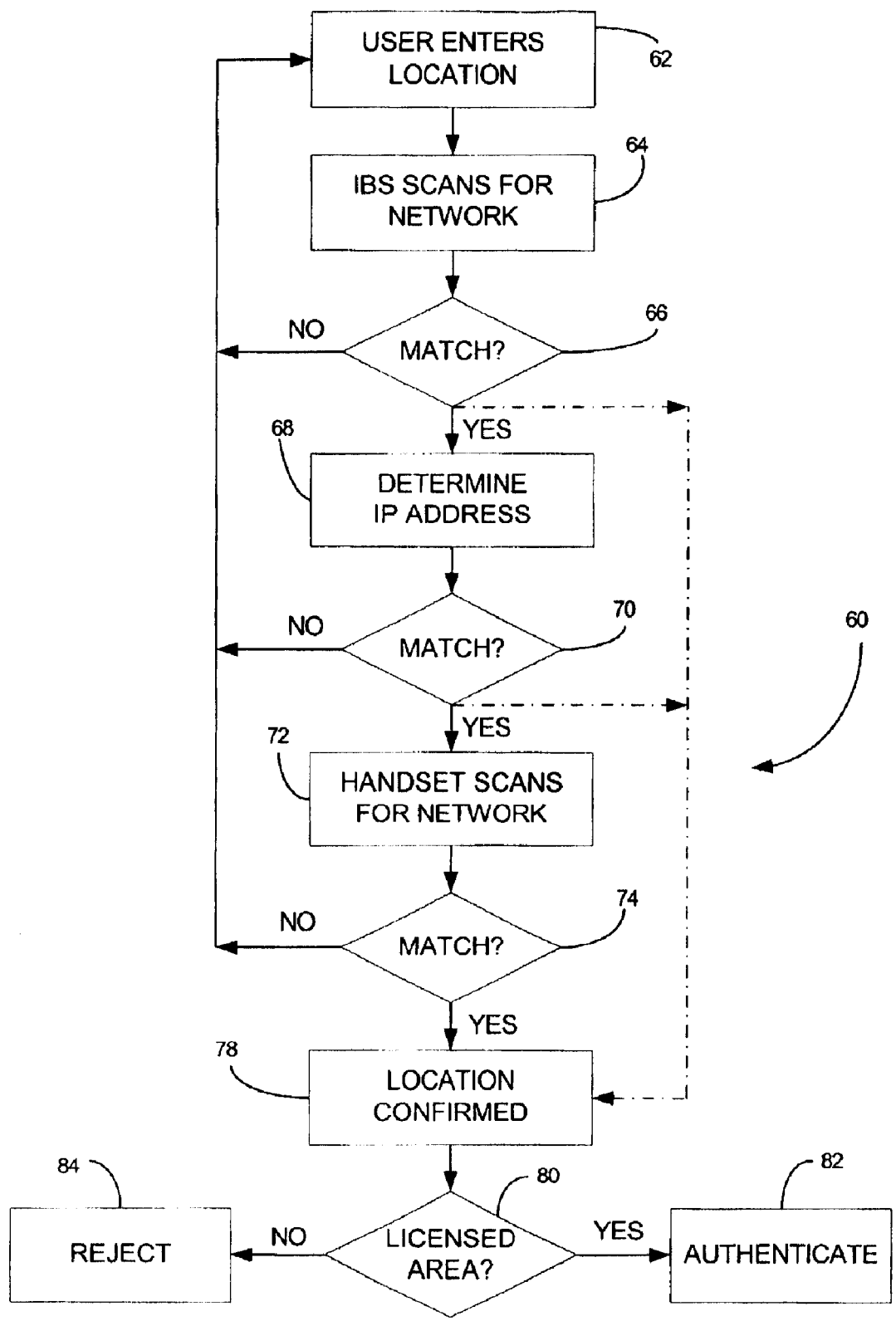
FIG. 6 is a flow diagram illustrating a process for authenticating the location of an Internet base station according to the present invention.

FIG. 6 illustrates a method 60 for authenticating the location of an IBS. Depending on the level of authentication desired, only some of the steps illustrated in method 60 may be performed. Additionally, the steps may be performed in any order and need not be performed in the order as illustrated. Generally, configuration manager 50 will have as a starting point the location of the IBS as manually entered by the user (step 62). This may include information such as state, city, street address and zip code. It is envisioned, however, that configuration manager 50 could authenticate the location of the IBS solely by the steps to be described, and without any manual input at all from the user. At a minimum, configuration manager 50 will usually be able to determine the operating network in which the IBS is deployed and, hence, a general idea of the physical location of the IBS.

One option for location determination is use of the IBS unit to scan the frequency spectrum for signals emitted by nearby base stations (step 64). Based on the channels on which wireless traffic is detected and the macrocell broadcast information carried on the control channels, configuration manager 50 can make a determination of the network in which the IBS unit is deployed. Configuration manager 50 can also use this information to assemble a neighboring list of nearby base stations. As previously mentioned, service providers are allocated specific frequency bands. If wireless traffic is detected on those bands, the configuration manager can correlate ID information carried on the control channels with information stored in the network database in order to determine the location of the IBS.

Once the identity of the network has been determined, configuration manager 50 can compare the location manually entered by the user to determine whether the location is within the identified network (step 66). If the location is not within the identified network, configuration manager 50 may refuse authentication and prompt the user to enter another location. If the location is within the identified network, configuration manager 50 may conclude that the user is at the location he provided (dashed line to step 78). Alternatively, if additional crosschecks are desired, method 60 may proceed to additional location verification steps 68 and/or 72.

The fact that different frequency bands are in use in different countries can also be used to assist authentication. In Germany, for example, the 900 MHz and 1800 MHz bands are used for wireless communications. Consider the example of a user of an IBS licensed for operation in the US Cingular network who manually enters the location Del Mar, Calif. even though he is actually in Germany and is attempting to configure his IBS there. The IBS unit will initiate a macrocell network scan and will receive "D1" and "D2" signals (two 900 MHz carriers in Germany), which will be relayed to the configuration manager. The configuration manager will not authenticate the IBS since it knows that the signals would not be present inside the Cingular network and, hence, the user could not possibly be in Del Mar, Calif. as he claims.

Another potential means of authentication is the Internet address of the computer to which IBS 42 is connected (step 68). The computer IP address can be used as a crosscheck against the information entered by the user and/or nearby base stations that are detected. If the location matches previous determinations, configuration manager 50 may conclude that the location is correct (dashed line to step 78) or may proceed with additional location verification steps (step 72). If there is no match, configuration manager 50 may refuse authentication and prompt the user to enter another location.

In remote or unserved areas of the network, the Internet address could potentially be the only means for independent authentication of the IBS location. Since the detected Internet address can be unreliable as a means for confirming location of the computer, it is preferably not the sole means for location authentication. It is, however, a good crosscheck option and is better than nothing when nothing else is available (i.e., extremely remote or isolated areas).

A related means for location identification is the routing information attached to messages routed between the configuration manager and the IBS. Internet messages routed between the two will include a listing of all Internet servers that the message passed through, from which general location information can be gleaned.

Another option for location determination is use of the user's handset (step 72). Essentially, the user's handset itself is used to detect any broadcast signals from nearby base stations. This is an attractive option in areas where the macrocell network cannot be reliably detected by the IBS, such as in underground and indoor areas. In one implementation, configuration manager 50 prompts the user to power his mobile handset on and to manually provide the phone number of the handset via the user interface. Configuration manager 50 can then send an appropriate program (utilizing the phone's SIM toolkit, for example) to the handset and prompt the user to walk outside or to a window. When the user's handset detects the presence of broadcasting base stations, it routes notification to configuration manager 50 (via the conventional and IP networks) and the operating network and proximate location of the handset is identified. Hence, the user's handset in cooperation with the configuration manager use the conventional macrocell network to authenticate the location of the IBS units.

If the network identified using the handset matches previous determinations and/or user entries, location is confirmed (step 78) or (if steps are performed in a different order) configuration manager 50 may proceed with other steps. Of course, if there is no match, the user is returned to step 62 and prompted for re-entry of his location. Use of a handset to determine location may be done as a last resort in view of the inconvenience to the user. Or, it could be combined with any or all of the previously discussed options in order to provide an extremely reliable indication of authenticity.

Finally, it should be noted that the IBS unit transceiver will typically be nonfunctional (due to its isolation from the network) during this handset phase. The possibility exists, however remote, that a user could use his handset to generate a location determination in one geographic region or network, when the IBS is actually in the network of another operator. This potential can be minimized by limiting the amount of time that may pass between reporting the results from the handset to the configuration and actually logging onto the IBS.

Once some combination of the steps depicted in FIG. 6 has resulted in confirmation of the location of the IBS unit (step 78), configuration manager 50 checks to determine whether the IBS unit at issue is licensed to operate at that location (step 80). In other words, if the IBS unit is a Cingular unit, configuration manager 50 determines whether the location of the IBS is within a Cingular network or a network having a roaming or hosting agreement with Cingular. If the IBS unit is within a licensed network, the unit is authenticated for operation within that network (step 82). If not, the IBS unit is rejected for operation on the network.

Performance Measurement/Bandwidth Reserve

Configuration manager 50 assesses the Internet link to the IBS unit and determines the quality of the link and how much bandwidth is available. Based on this assessment, a portion of the bandwidth available on the IBS-IBSC link is reserved for wireless traffic. Consider, for example, a scenario in which a user has indicated that three handsets will be operational within the IBS cell, one of which will also be using GPRS. A total of four timeslots or traffic channels need to be reserved. The average data rate for an active timeslot/traffic channel is approximately 16 kb/s. If the link has a capacity of 500 kb/s (both directions), configuration manager 50 may reserve 4 timeslots, or 4*16=64 kb/s of capacity, which is 12.8% of the total capacity.

Typically, there is a maximum percentage of the link that may be reserved for wireless traffic. If, in the previous example, the maximum capacity of the link was only 150 kb/s, and the maximum percentage of that capacity that can be reserved for wireless traffic was 25%, only 2 timeslots, or 2*16=32 kb/s of capacity, could be reserved. If no calls are made, no load is generated. So, in the reduced link capacity example, everything will be fine so long as only two of the four phones are in use at any one time. It should also be noted that, in addition to the traffic channel load, the control channel will generate a constant, minimal load.

Once the IBS unit has been authenticated for operation, personal information obtained and an appropriate amount of bandwidth reserved, any necessary operational software may be downloaded from configuration manager 50 (or another source) to the IBS unit and activated (or simply activated if already present). Following activation of the operational software, the duties of configuration manager 50 are complete. It may close and disconnect from the IBS unit, and should not be needed again unless the subscriber moves. In the event of a power failure or lost Internet connection, the IBS unit will reconnect automatically using the old (stored) parameters when the power or Internet connection is restored.

Once configuration manager 50 has disconnected, IBS 42 connects to its associated IBSC 48 (FIG. 4) and is authenticated and ready for subscriber use. Once IBS 42 is connected to IBSC 48 and operational on the network, the network operator may change parameters of IBS 42, such as frequencies, output power, software upgrades, etc., just like any other base station on the network. Some or all of these parameters may also be adjusted by the user via an appropriate user interface provided by the operating software.

Integration of IBS Cells into Macrocell Network

During the previously described configuration manager "location verification" phase, the IBS unit (or user handset, in some circumstances) searches all frequencies for neighboring macrocells. Once it has found at least one macrocell of the host network operator, this macrocell is identified and stored as a neighbor. The macrocell, in turn, identifies the IBS cell as a neighbor. Alternatively, as will be described in more detail below, there may be a limited number of pre-assigned IBS frequencies that are automatically added to the macrocell's neighbor list. In this manner, handovers between neighboring macrocells and IBS cells are facilitated.

Internet base stations according to the present invention have broadcast ID functionality (i.e., they broadcast their ID over control channels) in a like manner as conventional network base stations. Once a mobile has logged into or has been handed over to an IBS cell, an appropriate indication may be displayed on the handset display. For IBS cells within a Cingular network, for example, the handset display may indicate "Cingular" when the handset is logged into a macrocell and "Cingular IBiS" when the handset is logged into an IBS cell. If the network operator uses different tariffs or pricing structures for operation within macrocells versus operation within IBS cells, use of such distinct identifiers will be of benefit to the user.

Use of Limited IBS Frequencies

Since the coverage area and power output of each IBS cell is so small, the number of IBS cells within a macrocell network may be quite large. In fact, the number of IBS cells may be exponentially greater than the number of macrocells. This can pose a problem under conventional wireless network protocols, which typically limit the number of neighbors that a cell can have. Under the GSM specification, for example, the number of neighbors that a cell may have is limited to 32. To deal with this limitation, the inventors propose that a distinct and limited number of frequencies be reserved for use in IBS cells only. Since the output power and coverage area of IBS units is so small, a small number of frequencies can be simultaneously used within all IBS cells across the network. IBS cells in apartments separated only by a wall could even share the same frequencies simultaneously, since the already low output power is absorbed by the walls and other obstacles.

In one implementation, three (or any other appropriately small number) frequencies are designated as the only frequencies that will be used in all IBS cells across an operator's network. Rather than identifying and adding each neighboring IBS cell to its neighbor list, a macrocell can simply automatically add the three IBS frequencies to its neighbor list. Maintenance and updating of neighbor lists is simplified and streamlined, as is administration of call handoffs. With respect to macrocell neighbor lists, administration and maintenance of the lists will be equally as simple whether there are 10 or 10,000 IBS cells within the macrocell.

Cell ID/Paging Areas

Each cell in a wireless network has a unique cell ID and paging area ID. The cell base station broadcasts its cell ID over the control channel and, as previously described, this information is used to authenticate the location of IBS units within the network. Wireless network protocols typically place a limit on the number of cell IDs that may be used within each network. The GSM protocol standard, for example, limits each GSM network to 65,536 cell IDs and 65,536 paging area IDs. As with the limitation on the number of entries on a neighbor list, this limitation on the number of cell IDs poses a problem where there may be hundreds of thousands of IBS cells within the network. However, as was a novel method developed to overcome the neighbor list limitations, so has a novel method been developed to overcome the limitations on the number of cell IDs.

Essentially, each IBSC is considered a "virtual" cell. The HLR (Home Location Register) and VLR (Visitor Location Register) maintained at each MSC store the cell IDs of all handsets based in (HLR) or presently in (VLR) the operator's network. Each IBSC within the network is assigned one or more cell (and paging area) IDs. These cell and paging area IDs are stored in the HLR/VLR, and are hereinafter referred to as "external" cell IDs. Each IBSC, in turn, assigns "internal" cell IDs to each of its assigned IBSs, and maintains its own HLR/VLR tables that translate the external cell IDs to its internal cell IDs.

One effect of this numbering scheme that should be noted is that cell and paging area IDs are no longer unique within the network. In other words, an IBS cell ID stored in the internal HLR/VLR tables of an IBSC may be the same as a macrocell ID stored in the external MSC HLR/VLR tables. This is not a problem, however, so long as the IBSC internal cell IDs are different from the macrocell external cell IDs in the immediate area.

The cell ID external/internal numbering system is best understood by way of example. Consider an IBSC that controls 100,000 IBSs. The IBSC is configured in the MSC HLR/VLR with two paging areas and two cell IDs (1 and 2). Three mobile stations are present in the IBSC coverage area, as set forth in the following table:

| Mobile | Internal Cell ID | External Cell ID |
|--------|------------------|------------------|
| Mobile-1 | 6,567 | 2 |
| Mobile-2 | 7,300 | 2 |
| Mobile-3 | 120 | 1 |

Hence, to the MSC, mobile-1 is simply registered as being in cell ID 2. The IBSC, however, has an internal translation table that further identifies mobile-1 as being in internal cell ID 6,567. Mobile-2 is in external cell ID 2 and internal cell ID 7,300. Mobile-3 is in external cell ID 1 and internal cell ID 120. Should the MSC route a call to cell ID 2 for mobile-2, the IBSC will use internal cell ID 7,300 to call mobile-2. Should mobile-2 thereafter move to internal cell ID 120, the IBSC will send an update to the MSC that mobile-2 is now in (external) cell ID 1.

MObile personal Base Station (MOBS)

One special application of an IBS is a MObile personal Base Station (MOBS). A MOBS is intended to improve the call quality, capacity and network connectivity of high volume wireless subscribers that travel often and frequently find themselves in difficult indoor environments. The MOBS may connect to a wireless network in the same manner as does an IBS. It initially connects to a configuration manager, which performs all functions as described with reference to the IBS.

In view of its intended audience, the MOBS preferably has a streamlined configuration manager interface and can be very quickly deployed. Some set-up parameters and personal preferences may already be stored with the configuration manager from previous sessions and need not be entered again. Examples include the name of the MOBS subscriber, mobile number, preference/parameter settings such as coverage vs. privacy, and whether the subscriber has GPRS. Some procedures and parameters, of course must be repeated and re-assessed at each log on, such as authentication of the MOBS location and assessment of the bandwidth and quality of the Internet connection.

In order to limit configuration issues, MOBS units are typically smaller and lower power than IBS units. They may be configured to accept calls from a small set of phones used by the end user. Most preferably, after the MOBS is initially configured (which will typically require a PC), the MOBS can then be used and coupled to an IBSC without the need for a PC. MOBS with this functionality will typically be provided with a built-in view screen.

MOBS units take advantage of a critical feature of the present invention: the ability to quickly assign/reassign individual IBS units to different IBSCs. In conventional systems, the BTS units are essentially hardwired to their BSCs (via T1s, T3s or microwave links), requiring significant expense and effort to move a BTS to a different BSC. Such a move in the present invention, conversely, is virtually effortless since IBS units connect to the IBSC via the Internet.

The use of MOBS (and IBS) units and their inherently flexible IBSC connectivity provides network operators with much greater flexibility in managing their switch loads. If a major event such as a convention, super bowl, or the like draws a large number of mobile phone subscribers into a relatively small geographic region, wireless network resources in that region will be extremely strained. If some of those users have MOBS units, however, network usage could be spread over different IBSCs, potentially even in different states. Some of the overloading of the local switching equipment may be off-loaded to remote switching equipment with more available capacity.

MOBS may operate in several modes of operation. Where the MOBS is installed in the home area of its carrier, the MOBS will be connected to its home network and will operate in a usual manner. If the MOBS is out of its home area, the configuration manager will (upon attempted installation) determine whether there is a carrier in the region that has a roaming or hosting agreement with the MOBS' carrier.

If the MOBS is in a network that has a standard roaming agreement with its home network operator, the MOBS will be configured for operation in that network and will be a part of that network. If a Voicestream subscriber travels from Atlanta to San Diego, for example, the configuration manager will notice when attempting to configure the MOBS in San Diego that Voicestream has no license in San Diego. It will see, however, that Voicestream has a roaming agreement with Cingular. The MOBS will be configured as a Cingular IBS and will "roam" in the Cingular Network.

Alternatively, the MOBS may be in a network that has a "hosting agreement" with the MOBS' home network operator. Continuing the example above, the Atlanta MOBS would be configured as a remote Voicestream IBS in San Diego, and would be assigned a frequency and perhaps other parameters (such as maximum output power) by Cingular. This novel method for routing calls, which is made possible by the ability to quickly assign/reassign individual IBS/MOBS units to different IBSCs, permits the Atlanta operator to have an "island" of coverage far away from his network.

The hosting agreement would likely be an agreement between the operators to allow each other's subscribers to deploy their MOBS in each other's service areas. Both carriers benefit, as the home network operator obtains its usage minutes and is able to provide good call quality even to out-of-network subscribers, and the remote network operator does not have its capacity burdened by placing roaming subscribers on its network. Depending on the agreement between the carriers, the MOBS may refuse to register phones from other carriers. Hence, if a Voicestream MOBS was deployed in a Cingular network, the Voicestream subscriber could use the MOBS but a Cingular customer would be refused and diverted to his home (Cingular) network. Also, once the MOBS subscriber left the MOBS coverage area, his handset would be handed off to the host network and would switch to roaming mode.

Analog IBS

Another embodiment of the present invention involves connection of an IBS over a conventional analog telephone line to an IBSC. As previously discussed, it is often difficult to obtain mobile coverage in rural areas because the sparse traffic does not justify the expense to the carrier of extending its network (establishing base stations, laying new lines, etc.). In some areas, it may also be difficult to establish an IBS cell as previously discussed due to the unavailability of cable and DSL modems. If data traffic is sufficiently minimized, however, an IBS may be connected to an IBSC over an analog telephone line.

In a conventional GSM system, the base station connects to the base station controller via an Abis interface. The amount of data traffic over an "Internet-Abis" interface on an analog line between an IBS and IBSC is dependent on several parameters. The first is the number of traffic channels (TCH). The average data rate for an active data channel is approximately 16 kb/s. One GSM carrier frequency can support up to seven traffic channels, with one channel reserved as a control channel. Hence, for support of two traffic channels, a bandwidth of 32 kb/s is required. If DTX (a battery-saving feature that cuts back the output power of the wireless handset when you stop speaking) is used, data traffic may be minimized even further.

Another parameter affecting the amount of data traffic is the number of paging messages. Each mobile in a "paging area" is paged whenever a call comes in. To minimize traffic the analog IBS may be treated as a separate paging area, so that only mobiles in the analog IBS range will be paged. If only two mobile stations were within the analog IBS cell, for example, the amount of paging traffic would be very low (less than 100 b/s).

The number of location updates also affect the amount of data traffic. When a mobile enters the paging area of a new IBS, the mobile initiates a location update procedure. This entails transmission and reception of several short messages (less than 100 b/s). The number of mobiles involved in this procedure would likely be less than ten per hour.

Mobiles can also typically receive SMS (Short Message Service) messages. These are short, alphanumeric messages. A mobile station would not typically receive more than a few of these per hour. GPRS, if used, may use up to two timeslots and 28 kb/s.

A V.34 modem would permit use of 33.6 kb/s. With the above parameters in mind, the analog IBS could be configured with bandwidth reservations as follows: 1,000 b/s for one control channel; 100 b/s for O&M messages (network management functions); and 32,000 b/s for two traffic channels (or one GPRS channel), for a total of 33.1 kb/s. The modem will typically be integrated into the IBS unit, and will connect to a telephone plug like an analog telephone.

In an "always on" mode of operation, the IBS dials up the IBSC (after being configured for set up by the configuration manager) and remains permanently connected. If the link is lost, the IBS simply dials in again. This mode of operation is advantageous in that there is no call set up time, but has the associated drawback that the telephone line may be used for the analog IBS only. In a "dial up" mode, the IBS dials up the IBSC only if a mobile actually needs a service such as a call or location update. If a call is coming in for the mobile, the IBSC dials the IBS, establishes a connection, and places the call through to them mobile.

Since the analog IBS may be used to provide coverage in rural areas, it might have a higher output power than the IBSs previously described and might be installed outdoors, so that it covers multiple households and possibly even a neighborhood. An analog IBS configured in this manner is essentially a "public" base station. It could be direct connected to an IBSC (or possibly even a conventional BSC) since it uses dedicated telephone lines.

Other embodiments and implementations of the invention will be or will become apparent to one with skill in the art. All such additional embodiments and implementations are intended to be included within this description, to be within the scope of the invention and to be protected by the accompanying claims.

What is claimed is:

1. A method for configuring a portable, low power base station for communication with a conventional wireless network via the Internet comprising:
   connecting the base station to a computer and to an Internet access device;
   obtaining the location of the base station from user input to the computer;
   confirming that the user input location corresponds to a location determination made by scanning the frequency spectrum for control channels emitted by nearby base stations and identifying the base station broadcast information carried on the control channels; and
   confirming that the base station is located within a network in which it is authorized to operate.

2. A method as claimed in claim 1, and further comprising:
   setting the operating parameters of the base station in response to user input.

3. A method as claimed in claim 1, and further comprising:
   reserving an appropriate amount of bandwidth on the Internet link between the base station and an Internet base station controller in response to user input.

4. A method as claimed in claim 3, wherein the user input comprises the number of phones that will be operating in proximity to the base station.

5. A wireless communications network comprising:
   a mobile switching center;
   a plurality of Internet base station controllers coupled to the mobile switching center, wherein the mobile switching center manages wireless traffic between the Internet base station controllers, the PSTN and other mobile switching centers;
   a plurality of Internet base stations coupled to and managed by each Internet base station controller, each Internet base station establishing a small, low power area of wireless coverage that is configurable by the user of the base station; and a configuration manager for configuring and authenticating the Internet base stations for operation within the network.

6. A wireless communications network as claimed in claim 5, wherein the Internet base stations are linked to the Internet base station controllers via the Internet and a high speed modem, and wherein the Internet base station controllers are linked to the mobile switching center via a dedicated line.

7. A wireless communications network comprising:

a mobile switching center;

a plurality of Internet base station controllers coupled to the mobile switching center, wherein the mobile switching center manages wireless traffic between the Internet base station controllers, the PSTN and other mobile switching centers;

a plurality of Internet base stations coupled to and managed by each Internet base station controller, the Internet base stations being linked to the Internet base station controllers via an analog telephone line and a V.34 modem, and data traffic parameters being minimized to permit use of the modem, wherein approximately 32,000 b/s are reserved for traffic channels, approximately 1,000 b/s is reserved for a control channel and approximately 100 b/s is reserved for O&M messages; and each Internet base station establishing a small, low power area of wireless coverage that is configurable by the user of the base station.

8. An improved wireless communications network comprising:

a plurality of large coverage area macrocells established by base stations that are permanently linked to base station controllers; and a plurality of small coverage area Internet base station cells established by portable, low power base stations that are linked to Internet base station controllers residing on Internet servers via the Internet, wherein the increased number of total cells are accommodated within the total cell ID number limitations of the applicable wireless protocol by treating each Internet base station controller as a virtual cell.

9. An improved network as claimed in claim 8, wherein each Internet base station controller assigns a secondary set of cell IDs to the Internet base stations to which it is coupled, the secondary set of cell IDs being transparent to the HLR/VLR logs maintained by the mobile switching center.

10. An improved network as claimed in claim 8, wherein a small number of pre-assigned frequencies are designated for use network-wide within Internet base station cells, and wherein these pre-assigned frequencies are automatically added to the macrocell neighboring lists.

* * * * *